United States Patent Office 3,827,929
Patented Aug. 6, 1974

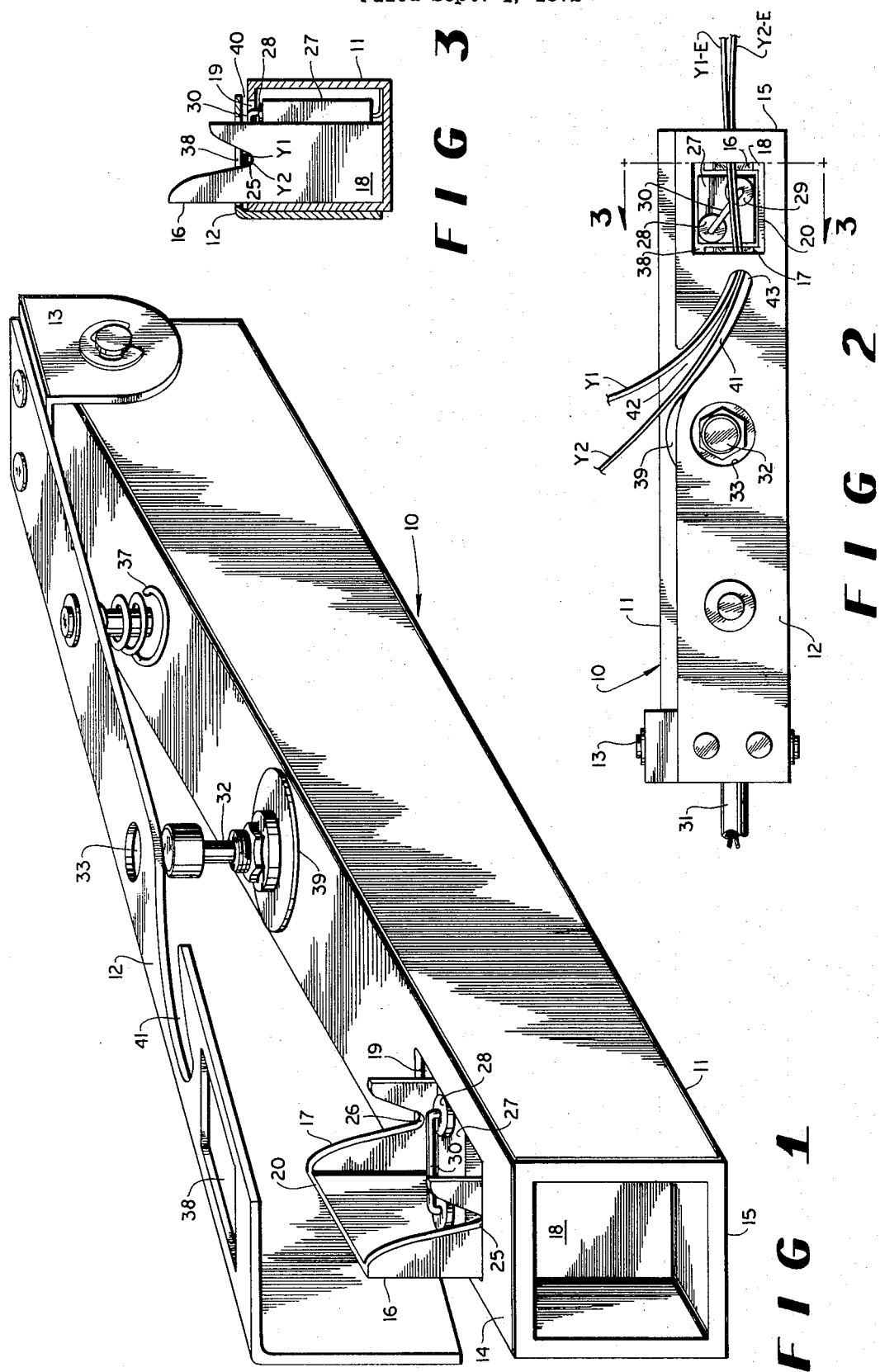

3,827,929
APPARATUS FOR JOINING THERMOPLASTIC MATERIAL
D. Wayne Bledsoe, 1928 Dug Gap Road, Dalton, Ga. 30720, and R. Alton Cadenhead, P.O. Box 810, Fitzgerald, Ga. 31750
Filed Sept. 1, 1972, Ser. No. 285,901
Int. Cl. B65h 69/06, 69/08
U.S. Cl. 156—502
8 Claims

ABSTRACT OF THE DISCLOSURE

The apparatus includes supports which position and hold ends of thermoplastic yarn or similar material, and includes a heating element which melts the thermoplastic material to join the yarn ends at the point of heating. Clamping apparatus maintains the yarn ends in position on the heating element. The yarn ends are aligned side-by-side during the joining operation, and the joint can be straightened and smoothed before the melted yarn material cools to its original linear relationship.

---

This invention relates in general to joining apparatus and in particular to apparatus for joining together lengths of thermoplastic material such as thermoplastic yarn ends or the like.

In various textile manufacturing processes, one or more of the yarns going to a machine occasionally break, and it is imperative that the broken yarn be mended before the manufacturing process continues or else the quality of the manufactured goods will be degraded. Since most textile manufacturing processes typically require manufacturing machinery which is expensive and which is capable of high-speed production, the machinery must be utilized to the greatest practical extent in order to minimize the unit cost of the manufactured material. Accordingly, it is apparent that a practicable apparatus for mending broken yarns must be capable of rapid and effective mending operation.

It will also be apparent that any practical yarn mending apparatus must be capable of producing a mended yarn having a joint or "weld" which is substantially undetectable when the welded yarn is incorporated in a manufactured product.

While prior art devices for mending thermoplastic yarn ends have been proposed for acceptance by the textile manufacturing industry, such devices have generally been found deficient for one or more reasons. One such prior art device, for example, is expensive to obtain and does not quickly and repeatably provide a desired quality of welded joint. Taken as a whole, prior art apparatus of the class described has not satisfied the needs of the textile manufacturing trade.

Accordingly, it is an object of the present invention to provide improved apparatus for joining thermoplastic material.

It is another object of the present invention to provide improved apparatus for joining lengths of thermoplastic yarn.

It is still another object of the present invention to provide a relatively inexpensive apparatus for joining together ends of thermoplastic yarn.

It is a further object of the present invention to provide apparatus for joining together ends of thermoplastic yarn to provide a welded joint which is substantially undetectable.

Other objects as well as many of the attendant advantages of the present invention will become more readily apparent from the following description of the disclosed preferred embodiment thereof, including the drawing in which:

FIG. 1 shows an isometric view of yarn mending apparatus according to a disclosed embodiment of the present invention;

FIG. 2 is a plan view of the apparatus as shown in FIG. 1, with a pair of yarn ends disposed therein for mending; and FIG. 3 is a section view taken along line 3—3 of FIG. 2.

Stated in general terms, the present invention provides a yarn guide for supporting in closely adjacent relationship the lengths of yarn to be mended, a heating device for selectively applying heat to the yarn segments thus supported, and a clamp which maintains the yarn segments in place on the guide device while the yarn segments are welded together by applied heat.

Stated more particularly, and with reference to the specifically disclosed embodiment of the present invention, as shown in the figures, there is shown generally at 10 a yarn mending apparatus including a generally elongate base member 11 having a clamping member 12 substantially coextensive with the surface 14 of the base member and pivotally attached to one end thereof by a suitable hinge 13. Projecting upwardly from the surface 14 of the base member 11, adjacent the end 15 thereof, is a yarn guide assembly 16 including a pair of upstanding members 17 and 18 extending through an opening 19 to terminate a spaced distance above the upper surface 14. The upstanding members 17 and 18 are preferably secured within the base member 11 by any suitable expedient, and it can be seen from FIG. 1 that the yarn guide assembly 16 in the disclosed embodiment of the present invention is advantageously fabricated from a unitary piece of material so that the upstanding members are joined together and are rigidly maintained in spaced-apart relation by the wall 20.

Each of the upstanding members 17 and 18 has formed therein a guide notch formed by side walls which converge to define the yarn support locations 25 and 26. Each of the pairs of converging side walls may be of dissimilar length, as is particularly apparent from FIG. 3, for ease of inserting lengths of yarn into the yarn guide assembly.

The yarn heating assembly 27 includes a pair of electrical terminals 28 and 29 having a resistance heating element 30 therebetween and positioned between the upstanding members 17 and 18. Although the resistance heating element 30 is depicted as a straight wire extending between the electrical terminals 28 and 29, the particular shape or configuration of the heating element is not critical to the present invention. It is important, however, that the heating element 30 be positioned to occupy the space including an imaginary line extending between the yarn support locations 25 and 26, as will become more apparent below.

Electrical power is supplied to the heating element 30 through a power cord 31 connected in series with a switch 32 extending outwardly from the upper surface 14 of the base member 11. An opening 33 is provided in the clamping member 12 so that the clamping member can be depressed to a position as shown in FIG. 2 without actuating the switch.

The clamping member 12 is normally biased by a suitable device, such as the compression spring 37, to assume an open position as depicted in FIG. 1, although it will be apparent that resilient devices of alternative design may be employed for the same purpose. The force of the spring 37 is designed to permit the clamping member 12 to be depressed to a position as shown in FIGS. 2 and 3, so that the upstanding members 17 and 18 of the yarn guide assembly extend through an appropriate opening 38 in the clamping member. The extent of such downward movement of the clamping member 12 is determined by abutment of the clamping member with yarn which is positioned adjacent yarn support locations 25 and 26.

The clamping member 12 has formed therein a yarn guide aperture in the form of an oblique slot 41 extending from an opening 42 at an edge of the clamping member to a closed end 43 located proximate to and spaced apart from opening 38.

Considering the operation of the yarn mending apparatus as described, it is assumed that the two lengths of yarn Y1 and Y2 are to be joined together by the present apparatus. With the clamping member 12 in the elevated or open position as shown in FIG. 1, the two lengths of yarn are positioned in the yarn guide assembly to lie along the yarn support locations 25 and 26 so that the yarn ends Y1–E and Y2–E extend a distance beyond the end 15 of the base member, as shown in FIG. 2. The clamping member 12 is then depressed aganst the force of the spring 37 into contact with the yarn. The opening 38 in the clamping member permits this clamping member to be lowered to a position below the elevation of the yarn support locations 25 and 26, as shown in FIG. 3, so that the yarn lengths Y1 and Y2 are rigidly secured in the yarn guide assembly in contact with the heating element 30. The oblique slot 41 affords substantial freedom of positioning for the remainder of the yarn lengths Y1 and Y2, so that only a minimum length of such yarn lengths need be withdrawn from the yarn utilization machinery for mending according to the present invention. With the clamping member 12 maintained in the lowered position, the switch 32 is actuated to apply power to the heating element 30. The thermoplastic yarn is melted at the point of contact with the heating element, at which time the switch 32 is released and the clamping member 12 is opened. The yarn ends Y1–E and Y2–E have been severed from the respective lengths Y1 and Y2 and can be removed. The yarn lengths Y1 and Y2, which are now welded together at a joint which is still in a semimolten state, can be withdrawn from the yarn guide assembly. These joined-together yarn lengths preferably can be straightened to the configuration of continuous yarn and the joint can be rolled between the fingers of an operator, before the yarn material at the joint cools, so that the joint is rendered sufficiently smooth to be substantially undetectable.

It will be understood, of course, that the foregoing relates only to a preferred embodiment of the present invention, and that numerous alterations and modifications may be made therein, without departing from the spirit and the scope of the present invention as defined in the following claims.

What is claimed is:

1. Apparatus for joining elongate lengths of thermoplastic material, comprising:

base means having a joining surface;

guide means defining a predetermined path for receiving plural lengths of material to be joined, said guide means being mounted in said base means and comprising a pair of spaced apart guide members disposed in upstanding relation to the joining surface;

heat producing means disposed adjacent said guide means and disposed on said predetermined path for heat transfer relation with a length of material received thereon, said heat prodcing means being selectively operative to produce heat sufficient to melt said thermoplastic material;

material retaining means removably disposed in surrounding relation with at least a portion of said guide means to selectively engage and restrain a length of material received on said predetermined path defined by said guide means; and a material guide channel positioned in said material retaining means to be in proximate alignment with said predetermined path defined by said guide means and said clamp means disposed in surrounding relation.

2. Apparatus as in Claim 1, further comprising:

said guide members each shaped to define a material receiving aperture having a closed material receiving portion, said material receiving portions being spaced apart from each other in predetermined elevated relation to said joining surface and aligned to define said predetermined path; and said heat producing means interposed between said spaced apart upstanding guide members and supported by said base member to extend in elevated relation to said surface in substantial alignment with said predetermined path defined by said material receiving portions.

3. Apparatus as in Claim 2, wherein:

said material retaining means includes a clamp member which is selectively positionable in surrounding relation with said closed material receiving portions of said guide members at an elevation which is less than said predetermined elevated relation of said closed material receiving portions, to retainingly engage lengths of material received on said closed material receiving portions.

4. Apparatus as in Claim 3, wherein:

said clamp member defines an opening having a peripheral region and dimensioned to receive said spaced apart guide members;

said clamp member being connected for selective movement to a first position with said guide members received in said surrounding relationship through said opening, and to a second position with said guide members withdrawn from said opening;

said peripheral region of opening being disposed between said material receiving portions and said joining surface when said clamp member is in said first position.

5. Apparatus as in Claim 4, further comprising:

a generally elongate material guide channel formed in said clamp member, said material guide channel having an open end located at an extremity of said clamp member and extending to a closed end at a location proximate to but spaced apart from said peripheral region of the opening therein;

said guide channel being aligned on said clamp member at an obtuse angle with respect to the predetermined path defined by said material receiving portions.

6. Apparatus as in Claim 5, including:

resilient means disposed in operative relation with said base means and said clamp member to bias said clamp member into said position.

7. Apparatus as in Claim 6, wherein:

said clamp member has a surface which is coextensive with and in confronting relation to at least a portion of said joining surface;

means pivotally interconnecting said clamp member and said joining surface at a location spaced from said guide members for said selective movement;

said heat producing means comprising an electrically heated member disposed in circuit with an electrical switch;

said electrical switch having an actuating member positioned to extend outwardly from said joining surface;

said surface of said clamp member including an aperture positioned in confronting alignment with said actuating member and of area sufficient to permit said actuating member to extend therethrough without actuating interaction between said clamp member and said actuating member in either of said positions.

8. Apparatus as in Claim 3, wherein:

said heat producing means comprises a selectively heatable member positioned between said spaced apart guide members and occupying a location on a line defined by said spaced apart material receiving portions.

References Cited

UNITED STATES PATENTS 3,492,181   1/1970   Riseley _____ 156—158

WILLIAM A. POWELL, Primary Examiner

B. J. LEITTEN, Assistant Examiner

U.S. Cl. X.R.

156—158, 296, 433